(12) United States Patent
Graf

(10) Patent No.: US 11,236,850 B2
(45) Date of Patent: Feb. 1, 2022

(54) CLAMPING DEVICE

(71) Applicant: Grafeye Limited, Witney (GB)

(72) Inventor: Gergo Graf, Oxford (GB)

(73) Assignee: GraFeye Limited

( * ) Notice: Subject to any disclaimer, the term of this patent is extended or adjusted under 35 U.S.C. 154(b) by 279 days.

(21) Appl. No.: 16/078,516

(22) PCT Filed: Feb. 23, 2017

(86) PCT No.: PCT/GB2017/050461
§ 371 (c)(1),
(2) Date: Aug. 21, 2018

(87) PCT Pub. No.: WO2017/144880
PCT Pub. Date: Aug. 31, 2017

(65) Prior Publication Data
US 2019/0086008 A1  Mar. 21, 2019

(30) Foreign Application Priority Data

Feb. 23, 2016 (GB) .................................... 1603097

(51) Int. Cl.
*F16L 23/06* (2006.01)
*F16L 37/12* (2006.01)
(Continued)

(52) U.S. Cl.
CPC ............ *F16L 23/06* (2013.01); *F16B 7/0413* (2013.01); *F16L 23/04* (2013.01); *F16L 37/1225* (2013.01); *F16L 37/20* (2013.01); *F16L 2201/10* (2013.01)

(58) Field of Classification Search
CPC . F16L 23/06; F16L 23/04; F16L 37/20; F16L 37/1225; F16L 2201/10; F16L 23/036; F16L 37/091; F16B 7/0413
See application file for complete search history.

(56) References Cited

U.S. PATENT DOCUMENTS 2,548,216 A * 4/1951 Houghton ............... F16L 23/08
                                                            285/408
2,801,116 A * 7/1957 Herman ................... F16L 23/04
                                                            285/365
(Continued)

FOREIGN PATENT DOCUMENTS

DE   102005051252      5/2007
DE   102007023987     12/2007
(Continued)

OTHER PUBLICATIONS

International Search Report and Written Opinion for Application No. PCT/GB2017/050461 dated Aug. 31, 2017.
(Continued)

*Primary Examiner* — James M Hewitt, II
(74) *Attorney, Agent, or Firm* — Tumey L.L.P.

(57) ABSTRACT

A clamping device suitable for securing a pair of flanges together is a unitary strip of a polymeric material that defines a multiplicity of clamping segments linked by flexible strip portions. The ends of the unitary strip define latching elements shaped to interconnect when the ends are brought together. Along one face of the unitary strip the clamping segments define teeth that project at opposite sides of the unitary strip, and these teeth define faces that are adapted in use to contact outer faces of the pair of flanges. Each clamping segments may define two opposing teeth. The clamping device can be operated with a single hand, being bent around the outside of the pair of flanges so that the clamping segments engage opposite faces of the pair of flanges and hold them together, and the latching elements are interconnected.

8 Claims, 2 Drawing Sheets

(51) Int. Cl.
*F16L 23/04* (2006.01)
*F16B 7/04* (2006.01)
*F16L 37/20* (2006.01)

(56) References Cited

U.S. PATENT DOCUMENTS

| | | | | |
|---|---|---|---|---|
| 3,059,947 | A * | 10/1962 | Felburg | F16L 23/08 |
| | | | | 285/410 |
| 3,099,060 | A * | 7/1963 | Smith | F16L 23/10 |
| | | | | 24/279 |
| 3,669,474 | A * | 6/1972 | Bode | F16L 23/14 |
| | | | | 285/336 |
| 3,822,075 | A * | 7/1974 | Duncan | F16L 23/04 |
| | | | | 285/367 |
| 4,708,377 | A * | 11/1987 | Hunting | F16L 23/04 |
| | | | | 24/20 S |
| 2007/0126234 | A1 * | 6/2007 | Wirth | F16L 23/10 |
| | | | | 285/410 |
| 2012/0227221 | A1 | 9/2012 | Whitaker et al. | |
| 2013/0257046 | A1 | 10/2013 | Henrich et al. | |

FOREIGN PATENT DOCUMENTS

| | | |
|---|---|---|
| WO | 2014172303 | 10/2014 |
| WO | 2016025978 | 2/2016 |

OTHER PUBLICATIONS

GB Search Report for Application No. GB1603097.5 dated Jul. 5, 2016.

\* cited by examiner

CLAMPING DEVICE

BACKGROUND OF THE INVENTION

The invention relates to a clamping device for securing rims or flanges together. It is suitable for use with flanges on vacuum pipes, and also for sanitary fittings.

One known type of clamping device consists of two semicircular parts, hinged together at one end, and provided with a threaded connector at the opposite end. This is effective, although the compression force may not be uniform around the entire circumference, and it is difficult to operate with one hand. US 2012/0227221 (Whitaker et al) describes a clamping device that consists of two disconnectable semicircular parts, where the hinge is formed by interlocking curved members at ends of the two parts, and where the other ends are provided with a latch element with teeth on one part that may engage with corresponding teeth on the other part; this may be easier to operate, the latch element avoiding the requirement for a threaded connector, but does not provide a uniform compression force around the circumference.

SUMMARY OF THE INVENTION

According to the present invention there is provided a clamping device suitable for securing a pair of rims or flanges together, the clamping device being a unitary strip of a polymeric material that defines a multiplicity of clamping segments linked by flexible strip portions, and wherein the ends of the unitary strip define latching elements shaped to interconnect when the ends are brought together; wherein along one face of the unitary strip the clamping segments define teeth that project at opposite sides of the unitary strip, the teeth at opposite sides of the unitary strip defining faces that are adapted in use to contact outer faces of the pair of rims or flanges.

By way of example each clamping segment might define a single projecting tooth at one side, adjacent clamping segments defining projecting teeth at opposite sides of the unitary strip.

However, in a preferred embodiment each clamping segment defines two teeth projecting from opposite sides of the clamping segment, the teeth defining opposing faces that are adapted in use to contact outer faces of the pair of rims or flanges.

In use the clamping device is bent around the outside of the pair of rims or flanges so that the clamping segments engage opposite faces of the pair of rims or flanges and hold them together, and the latching elements are interconnected. It will be appreciated that the length of the unitary strip, and so the number and lengths of the clamping segments, must correspond at least approximately to the circumference of the rims or flanges. In use of the clamping device the multiplicity of clamping segments around the perimeter of the flanges, and their short lengths, ensures substantially uniform clamping around the entire circumference.

With the exception of the clamping segments adjacent to the ends of the unitary strip, the clamping segment may, in a direction along the length of the unitary strip, have a length less than 10 mm, or preferably less than 8 mm, but the length is typically at least 3 mm. For example the length of each clamping segment may be between 4 and 6 mm. If the clamping segment is of different lengths at different positions, then this refers to the maximum length. The clamping segments adjacent to the ends of the unitary strip may have a length between two and three times that of the other clamping segments. The clamping segments may taper with height such that in use the ends of the teeth lie on radial lines. The clamping segments may also be of arcuate shape.

The portion of each clamping segment between the teeth is preferably significantly thicker than the thickness of the adjacent flexible strip portions, so that it is less flexible, and may project above the outer surface of the adjacent flexible strip portions at the face of the unitary strip opposite to that with the teeth.

The latching elements are shaped to interconnect the ends of the unitary strip, and one latching element may define one or more ratchet-shaped teeth to engage with the other latching element. The other latching element may define recesses to engage the ratchet-shaped teeth, or may also define projecting ratchet-shaped teeth, so the two sets of ratchet-shaped teeth can engage each other. Provision of a plurality of ratchet-shaped teeth on at least one latching element provides some potential variability in the circumferential length of the clamping device when in use, depending on how many of the ratchet-shaped teeth have come into engagement.

For ease of operation the clamping device may also define outward-projecting wings, so a user can squeeze the wings together to bring the latching elements into engagement. These wings may therefore act as finger grips, so the clamping device may be operated with a single hand. The latching elements may also be provided with a safety clip, which may also incorporate ratchet-shaped teeth and may also be actuated by the projecting wings. This safety clip is intended to ensure that accidental bumping of the projecting wings does not accidentally release the latching elements. For convenience one wing may be longer than the other.

The polymeric material of which the clamping device is formed must be tough, and may for example be an engineering plastic such as a polyimide (i.e. nylon). It may be formed by injection moulding or by 3-D printing.

BRIEF DESCRIPTION OF THE DRAWINGS

The invention will now be further and more particularly described, by way of example only, and with reference to the accompanying drawings in which.

DETAILED DESCRIPTION OF THE INVENTION

Figure 1:
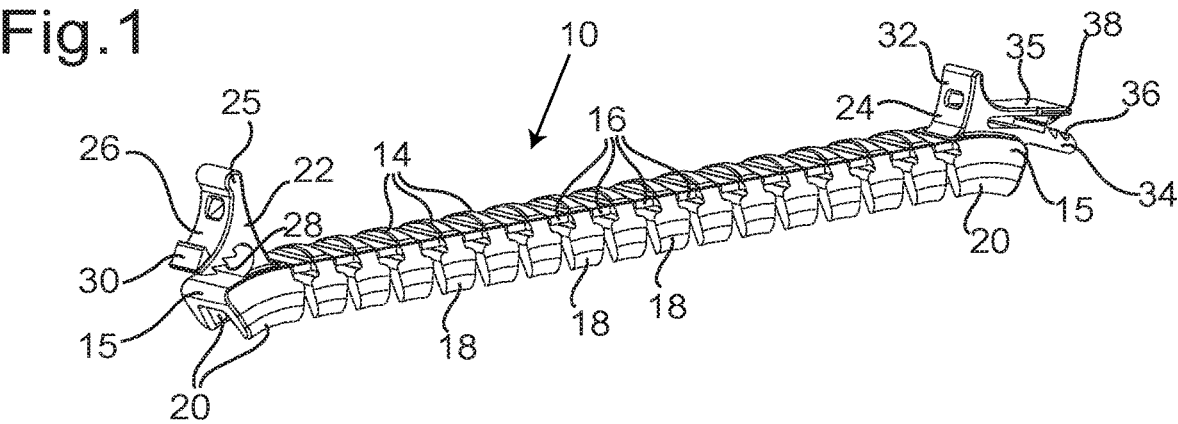
FIG. 1 shows a perspective view of a clamping device of the invention.
Figure 3:
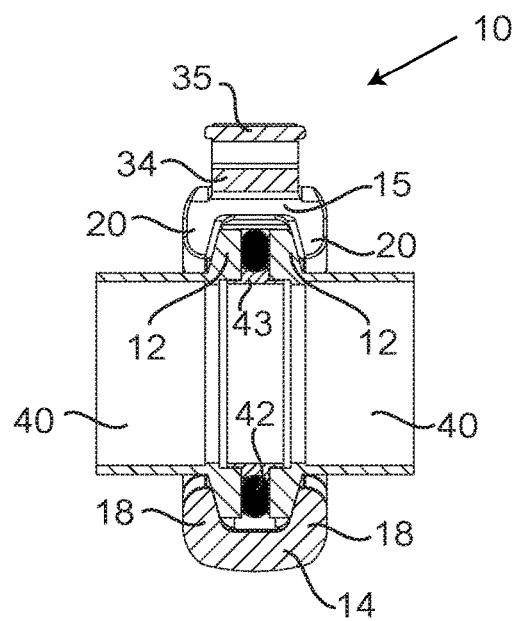
FIG. 3 shows a cross-sectional view of two pipe flanges being clamped together by the clamping device as shown in FIG. 2.
Figure 4:
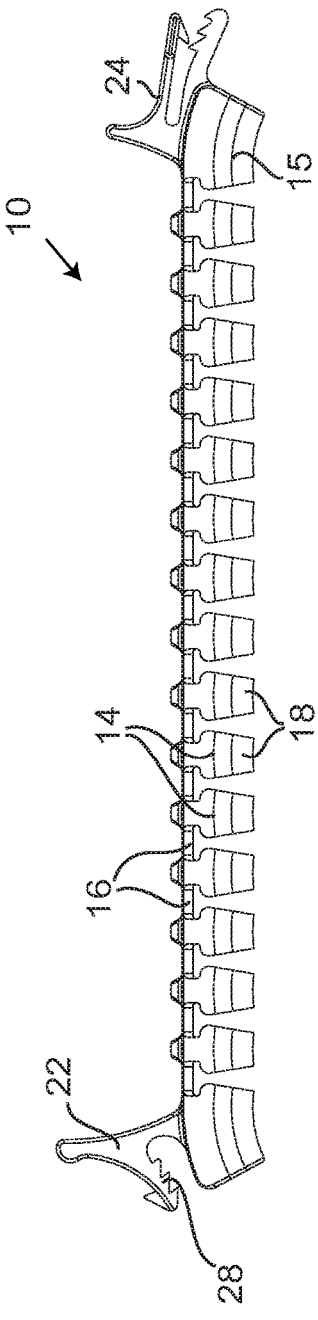
FIG. 4 shows a side view of the clamping of FIG. 1.
Figure 5:
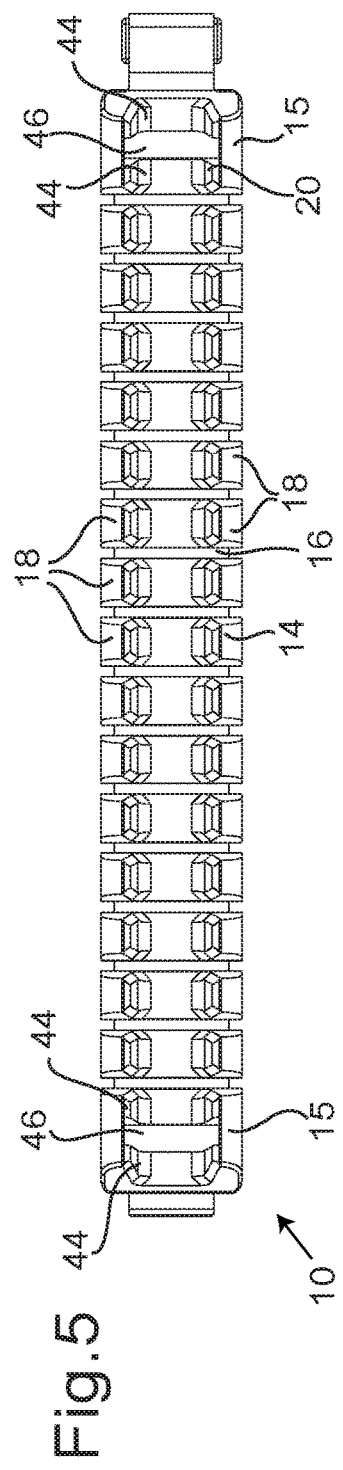
FIG. 5 shows an underside view of the clamping device of FIG. 1.

Referring now to FIGS. 1, 4 and 5, a clamping device 10 consists of a strip of nylon of such a length that it can extend around the perimeter of a flange 12 (shown in FIG. 3). The clamping device 10 defines fifteen clamping segments 14 and two end clamping segments 15, which are all linked together by flexible strip portions 16. Each of the clamping segments 14 is of maximum length 6 mm, while the end clamping segments 15 are each of maximum length 12 mm. Along one face of the clamping device 10 each clamping segment 14 defines two projecting teeth 18 projecting from opposite sides of the clamping segment 14, and each end clamping segment 15 defines two projecting teeth 20 projecting from opposite sides of the end clamping segment 15. At the opposite face of the clamping device 10, the end clamping segments 15 define latching elements 22 and 24 which are shaped so as to interconnect when the ends are brought together.

Figure 2:
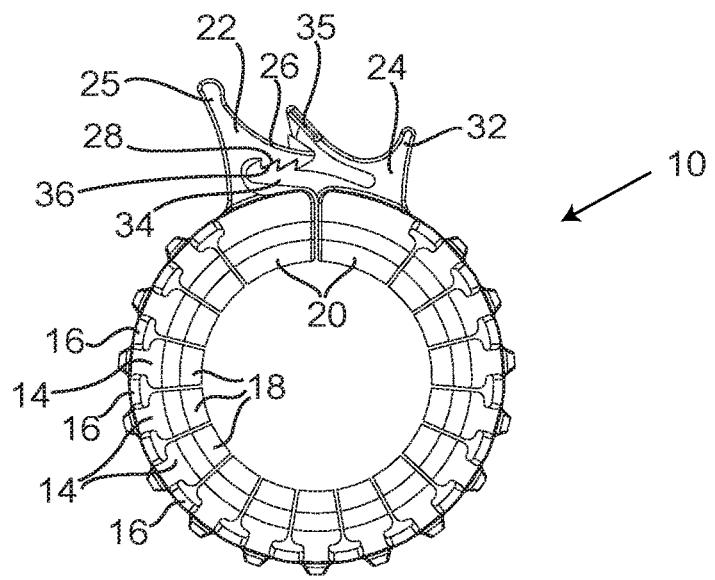
FIG. 2 shows an end view of the clamping device of FIG. 1 in its clamped state.

In use the clamping device 10 is intended to be bent around into a circular shape, with the projecting teeth 18 and 20 facing the inside of the circle. This position of the clamping device 10 is shown in FIG. 2. Each projecting tooth 18 and each projecting tooth 20 gradually decreases in length (measured in the direction along the length of the nylon strip) in the radial direction, when bent into this shape, so that the front and rear edges of the teeth 18 and 20 are on radial lines. When in this position there are radial gaps between successive teeth 18, 20 each gap being of width about 1 mm.

Referring again to FIG. 1, the latching element 22 consists of a wing 25 that projects from an intermediate position along the end clamping segment 15 and from which projects a rib 26 with three ratchet-shaped teeth 28 on its lower surface (in this paragraph references to upper and lower referred to the clamping device 10 as shown in FIG. 1) and with a single ratchet-shaped tooth 30 on its upper surface. The latching element 24 consists of a shorter wing 32 projecting from an intermediate position along the end clamping segment 15, a lower rib 34 that projects from the end of the end clamping segment 15, and a thinner upper rib 35 that projects from the shorter wing 32 above the lower rib 34. The lower rib 34 defines three ratchet-shaped teeth 36 on its upper surface, while the upper rib 35 defines a single ratchet-shaped tooth 38 on its lower surface near the end of the upper rib 35.

Referring again to FIG. 2, when the clamping device 10 is being bent into the circular shape a user can squeeze together the wing 25 and the shorter wing 32, so pushing the rib 26 into the gap between the lower rib 34 and the upper rib 35. This causes the ratchet-shaped teeth 28 on the rib 26 to engage with the ratchet-shaped teeth 36 on the lower rib 34. The clamping device is shown in the situation in which all three of the ratchet-shaped teeth 28 and 36 have come into engagement.

As a safety feature, the user can then further squeeze the shorter wing 32 towards the wing 25 and bending the upper rib 35 upward until the ratchet-shaped tooth 38 on the upper rib 35 engages with the ratchet-shaped tooth 30 on the rib 26; this is shown prior to engagement in FIG. 2. This would prevent unintentional disengagement of the latching elements 22 and 24, for example if the projecting wing 25 were to be accidentally knocked.

Releasing the clamping device 10 first involves bending up the upper rib 35 so that the ratchet shaped tooth 38 disengages from the ratchet-shaped tooth 30, if these have been engaged. Then the wing 25 is bent backwards, away from the wing 32, raising the rib 26 so that the ratchet-shaped teeth 28 come out of engagement with the ratchet-shaped teeth 36.

Referring now to FIG. 3, the clamping device 10 is intended for joining together flanges 12 at the ends of opposed tubes 40. In this example the tubes 40 are intended to be evacuated, and so an O-ring 42 and a spacer ring 43 are provided between the flanges 12. The clamping device 10 surrounds the two flanges 12. In this example the outer surface of each flange 12 is tapered, and the inner faces of the teeth 18 and 20 have a mating taper so that as the ends of the clamping device 10 are squeezed together as described above, the clamping segments 14 and the end clamping segments 15 are pushed radially inward and so squeeze the outer surfaces of the flanges 12 together, so compressing the O-ring 42 down to the thickness of the spacer ring 43.

Referring now to FIG. 5, as mentioned above each end clamping segment 15 is slightly over twice as long as each clamping segment 14. Each tooth 18 on the clamping segments 14 has a single surface at its inner face that comes into contact with the flange 12 as described above. The teeth 20 on the end clamping segments 15 each have two bearing surfaces 44 at their inner faces with a notch 46 between them.

Figure 7:
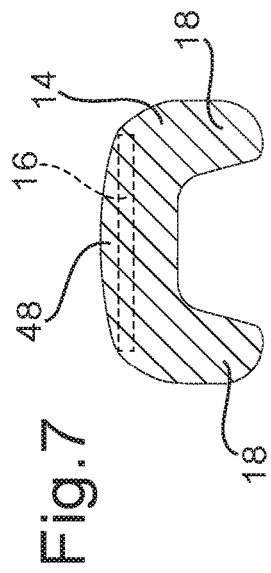
FIG. 7 shows a sectional view on the line 7-7 of FIG. 6.
Figure 6:
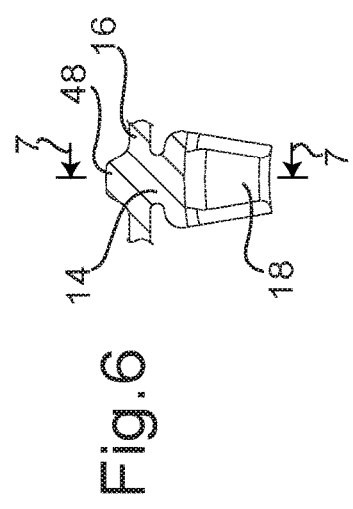
FIG. 6 shows a sectional view on the longitudinal axis of the clamping device, showing a single clamping segment.

Referring now to FIG. 6, which shows a longitudinal sectional view through a single clamping segment 14 shown larger than in the previous drawings, and FIG. 7 showing a sectional view on the line 7-7 of FIG. 6, it will be appreciated that the flexible strip portions 16 are considerably thinner than the portion of the clamping segment 14 between the teeth 18, and that at the upper surface of the clamping device 10 the clamping segments 14 define a ridge 48 that projects above the adjacent flexible strip portions 16 (shown in broken lines in FIG. 7). Consequently the portion of the clamping segment 14 between the opposed pair of teeth 18 is sufficiently rigid to provide the required pressure on the outer surfaces of the flanges 12.

It will be appreciated that the dimensions are given above by way of example, and that the number of clamping segments 14 and their sizes would depend upon the size of the flanges 12. For example a clamping device for use on a flange 12 of diameter 30 mm may have eleven clamping segments 14, each tooth 18 being of length 4.1 mm at its shortest (i.e. outermost) part, and each tooth 20 being of length 8.2 mm at its shortest part. The clamping device 10 described above for use on a flange 12 of diameter 40 mm has fifteen clamping segments 14, each tooth 18 being of length 4.8 mm at its shortest part, and each tooth 20 being of length 9.6 mm at its shortest part. A clamping device for use on a flange 12 of diameter 55 mm might have twenty-one clamping segments 14, each tooth 18 being of length 5.4 mm at its shortest part, and each tooth 20 being of length 10.8 mm at its shortest part. At least approximately, if there are N teeth 18, and assuming each tooth 20 is slightly over twice the length of each tooth 18, the angle subtended by a single tooth 18 when in the clamped position is $\{360°/(N+4)\}$, and if the edges of the teeth 18 and 20 are on radial lines in that clamped position it follows that each tooth 18 and 20 has that angle of taper.

What is claimed is:

1. A flange or rim clamping device, the clamping device being a unitary strip of a polymeric material that defines a multiplicity of clamping segments linked by flexible strip portions, and wherein the ends of the unitary strip define two latching elements, a first latching element comprising a rib having ratchet-shaped teeth on a lower surface and a ratchet-shaped tooth on an upper surface, and a second latching element comprising a lower rib comprising ratchet-shaped teeth and an upper rib comprising a ratchet-shaped tooth on a lower surface;

wherein ratchet shaped teeth of one latching element are shaped to engage with the ratchet-shaped teeth of the other latching element when the ends are brought together, and wherein the ratchet shaped tooth on the upper rib of the second latching element is configured to engage the ratchet shaped tooth on the upper surface of the rib of the first latching element to prevent unintentional disengagement;

wherein along one face of the unitary strip each clamping segment defines two teeth projecting from opposite sides of the clamping segment, the teeth defining opposing faces that contact outer faces of a pair of rims or flanges in use; and wherein a portion of each clamping segment is thicker than the thickness of the adjacent flexible strip portions and projects above the outer surface of the adjacent flexible strip portions to form a ridge at the face of the unitary strip opposite to that with the teeth, this portion extending between the teeth on opposite sides of the clamping segment.

2. The clamping device as claimed in claim 1, wherein the clamping segments, with the exception of the latching elements adjacent to the ends of the unitary strip, have a length less than 10 mm in a direction along the length of the unitary strip.

3. The clamping device as claimed in claim 2, wherein the clamping segments, with the exception of the latching elements adjacent to the ends of the unitary strip, have a length between 3 mm and 8 mm in the direction along the length of the unitary strip.

4. The clamping device as claimed in claim 1, wherein the latching elements adjacent to the ends of the unitary strip have a length between two and three times that of the other clamping segments.

5. The clamping device as claimed in claim 1, further comprising outward-projecting wings adapted to be squeezed together to bring the latching elements into engagement.

6. The clamping device as claimed in claim 1, wherein the polymeric material of which the clamping device is formed is a polyimide.

7. The clamping device as claimed in claim 1, wherein the clamping device is intended for connecting flanges that are separated by an O-ring and a spacer ring, wherein the outer face of each flange is tapered, and wherein the opposed faces of the teeth have a mating taper, so that operation of the clamping device compresses the O-ring down to the thickness of the spacer ring.

8. A flange or rim clamping device, the clamping device being a unitary strip of a polymeric material that defines a multiplicity of clamping segments linked by flexible strip portions, and wherein each end of the unitary strip defines a respective latching element, wherein a first latching element comprises a rib having ratchet-shaped teeth on a lower surface and a ratchet-shaped tooth on an upper surface, and a second latching element comprises a lower rib comprising ratchet-shaped teeth and an upper rib comprising a ratchet-shaped tooth on a lower surface, wherein ratchet shaped teeth of one latching element are shaped to engage with the ratchet-shaped teeth of the other latching element when the ends are brought together and wherein the ratchet shaped tooth on the upper rib of the second latching element is configured to engage the ratchet shaped tooth on the upper surface of the rib of the first latching element to prevent unintentional disengagement;

wherein along one face of the unitary strip each clamping segment defines two teeth projecting from opposite sides of the clamping segment, the teeth defining opposing faces that contact outer faces of a pair of rims or flanges in use; and wherein a portion of each clamping segment is thicker than the thickness of the adjacent flexible strip portions and projects above the outer surface of the adjacent flexible strip portions to form a ridge at the face of the unitary strip opposite to that with the teeth, this portion extending between the teeth on opposite sides of the clamping segment;

wherein the clamping segments adjacent to the ends of the unitary strip have a length between two and three times that of the other clamping segments;

the clamping device further comprising outward-projecting wings adapted to be squeezed together to bring the latching elements into engagement.

\* \* \* \* \*